July 6, 1943.  P. A. REH  2,323,677
DISTRIBUTING APPARATUS
Filed Oct. 24, 1941
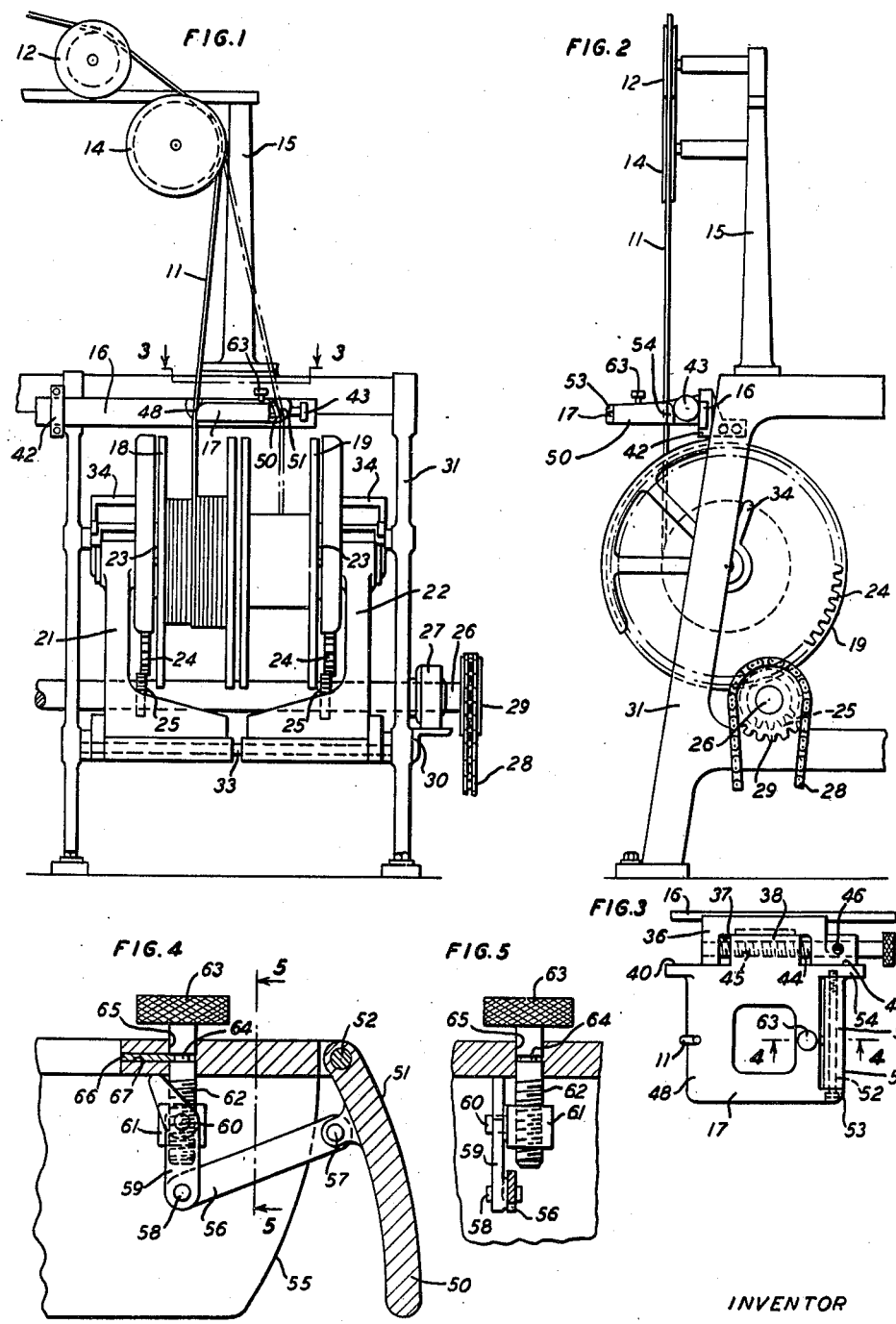
INVENTOR
P. A. REH
BY
E.R. Nowlan
ATTORNEY Patented July 6, 1943

2,323,677

UNITED STATES PATENT OFFICE 2,323,677

DISTRIBUTING APPARATUS

Paul A. Reh, East Orange, N. J., assignor to Western Electric Company, Incorporated, New York, N. Y., a corporation of New York Application October 24, 1941, Serial No. 416,302

12 Claims. (Cl. 242—25)

This invention relates to distributing apparatus, and more particularly to apparatus for distributing electrical conductors on take-up reels.

Electrical conductors upon leaving processing machines, for example wire drawing machines or insulation applying machines, are frequently wound upon take-up reels. In many instances, however, the take-up reels are not of sufficient size to receive the full lengths of the conductors and it has been found advantageous to provide a spare reel and a distributor guide capable of serving both reels.

An object of the invention is to provide a strand distributing apparatus which is simple in structure and accurately variable relative to a plurality of take-up reels to distribute strands thereon.

With this and other objects in view, the invention comprises a distributing apparatus having an arm reciprocable between predetermined limits and a distributing element mounted to travel with the arm and having surfaces to distribute advancing material over spaced areas, the surfaces being variable relative to each other to vary the relative locations of the said areas.

Other objects and advantages will be apparent from the following detailed description when taken in conjunction with the accompanying drawing, wherein Fig. 1 is a front elevational view of a portion of the apparatus;

Fig. 2 is a side elevational view of the structure shown in Fig. 1;

Fig. 3 is a top plan view of the guide unit, this being an enlarged view taken along the line 3—3 of Fig. 1;

Fig. 4 is an enlarged fragmentary sectional view taken substantially along the line 4—4 of Fig. 3, and Fig. 5 is a fragmentary sectional view taken along the line 5—5 of Fig. 4.

Referring now to the drawing, attention is first directed to Figs. 1 and 2 which illustrate one embodiment of the invention for distributing strands, for example insulated electrical conductors. In the present instance a single conductor 11 is shown, this conductor hereinafter being termed a strand. The strand 11 may be received from a processing machine (not shown) and may travel over suitable sheaves 12 and 14 mounted upon a support 15. Upon leaving the sheave 14 the strand 11 passes relative to a reciprocable arm 16 and a distributor element 17 to a take-up reel 18.

The strand in the present instance is being wound upon the take-up reel 18 and although this reel is of sufficient size for the length of strand to be wound thereon, it is not of sufficient size to receive the full length of the strand processed by the machine. In order that a take-up mechanism may be provided for the continuous winding of the strand from the machine, another reel 19 is provided to receive the strand after the reel 18 has been filled. The reels 18 and 19 are mounted upon brackets 21 and 22 respectively which carry suitable shafts 23 for supporting their respective reels. The shafts 23 have gears 24 mounted thereon to rotate the reel shafts and the reels at like or variable speeds in like directions for the winding of the strand thereon. Gears 24 interengage respective pinions 25, the latter being mounted upon a shaft 26 which is journalled in suitable bearings, such as the one indicated at 27, and driven by suitable power means operatively connected thereto through a chain 28 and a sprocket wheel 29. The bearing 27 is mounted upon a projection 30 of a frame 31, the latter serving in general as a supporting means for the entire structure. The brackets 21 and 22 are mounted upon a common shaft or pivotal support 33 the ends of which are carried by the frame 31, this supporting means for the brackets enabling movement thereof with their respective reels and gears outwardly for the removal of a full reel and the mounting of an empty reel on the shafts 23 thereof. Handle portions 34 facilitate in the movement of the reels into and out of loading positions. Suitable means may be provided to support the brackets in their vertical or running positions.

The arm 16 may be of any suitable structure and operatively connected to a power means (not shown) to receive reciprocable movement between predetermined limits therefrom. The arm 16 supports a bracket 36 which is substantially U-shaped in contour, as shown in Fig. 3, providing a central groove 37 to receive a tongue portion 38 of the distributor element 17. In addition to the tongue portion 38 the guide has extended flat surfaces 40 to engage similar surfaces of the end portions of the bracket 36 for a sliding engagement therewith and to maintain the guide in a definite plane while being movable in any selected position relative to the arm 16. The arm 16 is movable in suitable guide members 42, only one of which is shown. An adjusting screw 43, carried by the bracket 36, has a threaded central portion 44 which passes through a threaded aperture 45 of the tongue portion 38 to bring about lateral movement of the element 17 relative to the arm 16 when the screw is rotated in either direction. A set screw 46 functions to allow rotative movement of the screw 43 but serves to hold the screw against axial movement.

The element 17 is of suitable width to allow for the lateral movement of the strand being distributed to one of the reels as the strand builds up on the reel. One side of the guide has a fixed guide surface 48 curved, as illustrated in Fig. 1, to allow the strand to move freely thereon but to definitely guide the strand to a position on the reel as the arm is moved back and forth. The opposite side of the element is provided with a variable member 50 having a curved guide surface 51 and pivotally mounted upon a screw 52 the ends of which are supported by projections 53 and 54 of the guide. The adjacent side of the element 17 indicated at 55 is curved to conform to the curvature of the member 50 so that if desired, the member may be moved into close engagement therewith. A link 56, pivotally connected at 57 to the member 50, connects the member through a pivotal connection 58 to an adjusting lever 59. The lever 59 is pivotally supported at 60 upon a threaded nut 61, the latter being mounted upon a threaded end 62 of an adjusting screw 63. The adjusting screw 63 is grooved, at 64, and is disposed in an aperture 65 of the element 17. A key 66 is disposed in a slot 67 of the element 17 and enters the groove 64 to hold the screw 63 against axial movement but to permit rotation thereof.

When the apparatus is in operation the strand 11 travels over the sheaves 12 and 14 to one of the reels, in the present instance the reel 18, upon which the strand is wound during the rotation of the reel. The reel is rotated through the chain 28 which connects the sprocket wheel 29 to the power means (not shown), rotating the shaft 26 which rotates the pinions 25, rotating both reels through their gears 24. During this interval of operation the arm 16 is reciprocated between predetermined limits to move the element 17 laterally relative to the reels. In the present illustration the surface 48 guides the strand 11, which travels under tension, over the surface. The movement of the arm is such that the strand will be laid in adjacent convolutions on the reel beginning adjacent one head of the reel, and terminating adjacent the other head thereof.

The reels employed may vary slightly in contour or in the thickness of the heads thereof and the location of the element 17 for the distribution of the strand on one reel may not be satisfactory for the distribution of the strand on another reel. Thus it is important that the relative position of the element and the reels be variable to compensate for this variation in the dimensions or contours of the reels. To bring about an adjustment of the element 17 for the strand being wound upon the reel 18, the screw 43 may be rotated in the desired direction to vary the area of the reel upon which the strand is wound. Assume, for example, that the element 17 is out of adjustment, that is that the element is located too far to the right (Fig. 1). This would result in the convolutions of the strand piling up adjacent the right head of the reel 18 and not reaching the left head thereof, causing an uneven lay of the convolutions on the reel. Adjustment of the screw 43 causing the element to move the correct distance to the left will remove the irregularity in the lay of the strand on the reel. In distributing the strand on the reel the surface 48 pushes the strand as the strand travels to the left on the reel, and controls the speed of movement of the strand to the right urged in that direction by the location of the sheave 14, thus causing an even lay of the strand as the element moves to the right.

As soon as the reel 18 becomes filled the strand may be moved across the inner heads of the reels to the drum of the reel 19 and passed therearound for one convolution until the starting portion of the strand is overlapped by the beginning of the second convolution thereof, after which the strand will continue to be served on the reel 19, the inner connecting strand portion having been severed. In passing the strand from one reel to the other, the strand is removed from the surface 48 and placed upon the surface 51 of the element 50. The full reel 18 may be moved outwardly by moving the bracket 21 about its shaft 23 and an empty reel may be disposed thereon. The bracket 21 with the empty reel may then be moved back into place, connecting the gear 24 associated therewith with its pinion 25.

Returning now to the member 50, attention is directed to the fact that the surface 51 thereof serves the same function as the surface 48 yet to distribute the strand to a different reel. The movement of the arm continues, yet if any adjustment of the element has been made relative to the arm for controlling the lay of the strand on the reel 18, adjustment of the member 50 may be made to bring about an accurate lay of the strand on the reel 19. This adjustment is brought about, not through the adjustment of the screw 43, but through the adjustment of the screw 63. Although the element in general may be adjusted through the aid of the screw 43 and cause an accurate lay of the convolutions of the strand on the reel 19, such an adjustment would move the surface 48 out of adjustment for its respective reel. Therefore, the adjustment of the element in general remains the same, the adjustment for the reel 19 being brought about through the movement of its distributing surface 51. If, through the adjustment of the element to the left for the reel 18, the surface 51 is located too far to the left for the reel 19, the screw 63 may be rotated in a clockwise direction, looking down thereon, causing upward movement of the nut 61 to move the pivot 60 upwardly (Fig. 4). This upward movement of the pivot 60 moving with it the lever 59, causes the upper rounded end of the lever engaging the under surface of the guide to move to the left, effecting a counterclockwise movement of the lever and, through the connection of the link 56, causing an outward or counterclockwise movement of the member 50. This results in the effective movement of the surface 51 to the right and although the surface is moved arcuately the effective variation in its position shifts the area of distribution of the strand on the reel 19. It is apparent that through the adjusting means associated with the screws 43 and 63, the distributing areas of both surfaces 48 and 51 may be moved like distances in either direction or may be moved toward or away from each other.

Although the strand distributing apparatus has been illustrated to distribute a single strand at different intervals to different reels, it is apparent that the apparatus would be equally efficient in distributing the two strands simultaneously to different reels or to separate portions of a single reel.

The embodiment of the invention herein disclosed is merely illustrative and may be widely modified and departed from in many ways without departing from the spirit and scope of the invention as pointed out in and limited solely by the appended claims.

What is claimed is:

1. A distributing apparatus comprising an arm reciprocal between predetermined limits, a distributing element mounted for movement with the arm and having spaced surfaces to separately distribute advancing material over different areas, and means to vary the relative positions of the said surfaces to vary the relative locations of the said areas over which the material is distributed.

2. A distributing apparatus comprising an arm reciprocal between predetermined limits, a distributing element mounted for movement with the arm and having spaced surfaces to separately distribute advancing material over different areas, means to vary the position of the element relative to the arm to cause one of the said surfaces to vary the location of its area of distribution of material, and means to vary the position of the other surface to cause variation of the location of its area of distribution of material.

3. A distributing apparatus comprising an arm reciprocal between predetermined limits, a distributing element mounted for movement with the arm and having a fixed surface and a variable surface to respectively distribute advancing material over different areas, and means to move the variable surface relative to the fixed surface to vary the relative locations of the said areas over which the material is distributed.

4. A distributing apparatus comprising an arm reciprocal between predetermined limits, a distributing element mounted for movement with the arm and having a fixed surface and a member with a variable surface, the said surfaces being adapted to respectively distribute advancing material over different areas, and means to cause movement of the member to move the surface thereof relative to the fixed surface to vary the relative locations of the said areas.

5. A distributing apparatus comprising an arm reciprocal between predetermined limits, a distributing element mounted for movement with the arm and having spaced surfaces to separately distribute advancing material over different areas, means to vary the relative positions of the said surfaces to vary the relative locations of the said areas over which the material is distributed, and means to move the element relative to the arm to further vary the locations of the said areas.

6. A distributing apparatus comprising an arm reciprocal between predetermined limits, a distributing element mounted for movement with the arm and having a fixed surface and a member with a variable surface, the said surfaces being adapted to respectively distribute advancing material over given areas, means to cause movement of the member to move the surface thereof relative to the fixed surface to vary the relative locations of the said areas, and means to move the element relative to the arm to further vary the locations of the said areas.

7. A distributing apparatus comprising an arm reciprocal between predetermined limits, a distributing element mounted for movement with the arm and having a fixed surface and a member with a variable surface, the said surfaces being adapted to respectively distribute advancing material over given areas, means on the element to movably support the member, and means to cause movement of the member to move the surface thereof relative to the fixed surface to vary the relative locations of the said areas.

8. A distributing apparatus comprising an arm reciprocal between predetermined limits, rotatable portions to receive material and to wind the material thereon, a distributing element mounted for movement with the arm and having spaced surfaces to separately distribute the material on the portions, and means to vary the relative positions of the said surfaces to cause uniform distribution of the material on the rotatable portions.

9. A distributing apparatus comprising an arm reciprocal between predetermined limits, rotatable portions to receive material and to wind the material thereon, a distributing element mounted for movement with the arm and having surfaces to distribute the material on the portions, and means to vary the locations of the said surfaces relative to their rotatable portions and to each other to render one surface effective to uniformly distribute the material on its rotatable portion and to render the other surface effective to subsequently distribute the material uniformly on its rotatable portion.

10. A distributing apparatus comprising take-up reels rotatable for the winding of material thereon, an arm reciprocal between predetermined limits, a distributing element mounted for movement with the arm and having spaced surfaces to separately distribute the material on their respective reels, and means to vary the relative positions of the said surfaces to cause uniform distribution of the material on the take-up reels.

11. A distributing apparatus comprising take-up reels rotatable for the winding of material thereon, an arm reciprocal between predetermined limits, a distributing element mounted for movement with the arm and having spaced surfaces to separately distribute the material on their respective reels, and means to vary the locations of the said surfaces relative to each other and to their respective reels to render one surface effective to uniformly distribute the material on its reel and render the other surface effective to subsequently distribute the material uniformly on its reel.

12. A distributing apparatus comprising separate means to removably support take-up reels and cause rotation thereof for the winding of material thereon, an arm reciprocal between predetermined limits, a distributing element mounted for movement with the arm and having spaced surfaces to separately distribute the material on their respective reels, and means to vary the locations of the said surfaces relative to each other and to their respective reels to render one surface effective to uniformly distribute the material on its reel and render the other surface effective to subsequently distribute the material uniformly on its reel.

PAUL A. REH.